United States Patent
Kim et al.

(10) Patent No.: US 12,244,702 B2
(45) Date of Patent: Mar. 4, 2025

(54) METHOD FOR GENERATING AND AUTHENTICATING THREE-DIMENSIONAL DYNAMIC OTP WITHOUT PASSWORD INPUT

(71) Applicants: Jong-Seong Kim, Yongin-si (KR); Eun-Hee Lee, Seoul (KR); Hyun-Min Kim, Yongin-si (KR)

(72) Inventors: Jong-Seong Kim, Yongin-si (KR); Eun-Hee Lee, Seoul (KR); Hyun-Min Kim, Yongin-si (KR)

(*) Notice: Subject to any disclaimer, the term of this patent is extended or adjusted under 35 U.S.C. 154(b) by 341 days.

(21) Appl. No.: 17/825,184

(22) Filed: May 26, 2022

(65) Prior Publication Data
US 2023/0042697 A1 Feb. 9, 2023

(30) Foreign Application Priority Data
Aug. 9, 2021 (KR) .......... 10-2021-0104534

(51) Int. Cl.
*H04L 29/00* (2006.01)
*H04L 9/08* (2006.01)
*H04L 9/32* (2006.01)

(52) U.S. Cl.
CPC .......... *H04L 9/0861* (2013.01); *H04L 9/0825* (2013.01); *H04L 9/3228* (2013.01)

(58) Field of Classification Search
CPC .... H04L 9/0861; H04L 9/0825; H04L 9/3228
USPC .......................................................... 380/28
See application file for complete search history.

(56) References Cited

U.S. PATENT DOCUMENTS

2013/0315388 A1* 11/2013 Chiarella ............... G06F 7/58
 380/28
2018/0270067 A1* 9/2018 Woo ........................ H04L 9/32

FOREIGN PATENT DOCUMENTS

KR            101199947 B1    11/2012
KR        1020150095231 A     8/2015
KR        1020160039593 A     4/2016

OTHER PUBLICATIONS

Korean Office Action (KR 10-2021-0104534), KIPO, Dec. 6, 2021.
Korean Notice of Allowance (KR 10-2021-0104534), KIPO, Jan. 26, 2022.

* cited by examiner

*Primary Examiner* — Brandon Hoffman
*Assistant Examiner* — Michael D Anderson
(74) *Attorney, Agent, or Firm* — Park & Associates IP Law Office

(57) ABSTRACT

Disclosed is a method for generating and authenticating a three-dimensional dynamic OTP that does not require input of a password. In the method, a user address received from a user terminal is converted into coordinate values in degrees, minutes, and seconds on latitude and longitude, and set as address coordinates from the coordinates in a unit of seconds and then a two-dimensional reference coordinate system is displayed that is subdivided with the address coordinates as an origin, a two-dimensional function is provided and rotated about an arbitrary axis to form a three-dimensional space by a three-dimensional function, one OTP generation coordinate within the three-dimensional space is provided, and then a one-time password is generated by combining respective coordinate values of x, y, and z axes of the one OTP generation coordinate.

16 Claims, 8 Drawing Sheets

METHOD FOR GENERATING AND AUTHENTICATING THREE-DIMENSIONAL DYNAMIC OTP WITHOUT PASSWORD INPUT

REFERENCE TO RELATED APPLICATIONS

This application claims the priority benefit of Korean Patent Application No. 10-2021-0104534 filed on Aug. 9, 2021, the entire contents of which are incorporated herein by reference.

FIELD OF THE INVENTION

The present disclosure relates to generating a one-time password (referred to as OTP), and more particularly, to a method for generating and authenticating a three-dimensional dynamic OTP that does not require input of a password.

BACKGROUND OF THE INVENTION

A one-time password (OTP), mainly used in electronic financial transactions, is a method for authenticating a user with a password that is randomly generated, instead of a fixed password. The OTP, which has been introduced to enhance security, is required to be input at the time of login or payment, and is used for user authentication.

Since the OTP is literally a one-time password, there is no need to memorize or store the password, which leads to convenience for use; however, the OTP is also affected by the time function, and as a consequence, it is not free from the risk of hacking.

There is a biometric password as a user authentication method that is as widely used as the OTP in electronic financial transactions, but with the advancement of hacking technology, the biometric password is also being hacked. In recent years, new quantum cryptography technology has been used to prevent hackers from performing the man-in-the-middle interception, or the like, but it has limitations in popularization in that it has disadvantages such as slow processing speed and physical damage due to combination with hardware and it takes a lot of time and cost to solve problems.

Therefore, there is an urgent need for a new type of password generating system or method that is robust against hacking and is convenient to use, and that is capable of minimizing the cost and time required to solve problems.

Examples of the related art include Korean Patent Laid-Open Publication No. 10-2015-0095231.

SUMMARY OF THE INVENTION

Accordingly, the present disclosure is a disclosure made in consideration of the above-mentioned necessity, and a main object of the present disclosure is to provide a method for generating and authenticating a three-dimensional dynamic OTP, which is robust against hacking and is convenient to use.

Another object of the present disclosure is to provide a method for generating and authenticating a one-time password, which is capable of authenticating a user or a product without input of a password by the user.

According to an aspect of the present disclosure, there is provided method for generating a three-dimensional dynamic one-time password (OTP) that is applied to a one-time password authentication system including a user terminal and an OTP server connected to the user terminal, the method including: setting, by the OTP server, a user address received from the user terminal as address coordinates by converting the user address into coordinate values in degrees, minutes, and seconds on latitude and longitude and reflecting the coordinate values in a unit of seconds to a digits (a>0) after a decimal point; displaying a two-dimensional reference coordinate system with a scale unit that is subdivided to c digits (c>a) after the decimal point with the address coordinates as an origin; forming and displaying a three-dimensional space represented by a three-dimensional function in a three-dimensional space coordinate system, by receiving a two-dimensional function and first boundary coordinates and second boundary coordinates included in the two-dimensional function in the two-dimensional reference coordinate system, and dynamically rotating the two-dimensional function about an arbitrary axis; receiving one OTP generation coordinate in the three-dimensional space; and generating a one-time password by generating an OTP generation code by combining respective coordinate values of x, y, and z-axes of the one OTP generation coordinate, and applying a preset generation pattern from the OTP generation code.

According to another aspect of the present disclosure, there is provided a method for authenticating a three-dimensional dynamic OTP that is applied to a one-time password authentication system including a user terminal storing code generation coordinates, an OTP server connected to the user terminal through a communication network, and an authentication server connected to the OTP server through an internal network and storing a terminal identification code, the method including: receiving, by the OTP server, address coordinates and the code generation coordinates together with an OTP authentication request from the user terminal; transmitting, by the OTP server, the code generation coordinates to the authentication server, such that the authentication server generates a terminal identification code from the code generation coordinates; verifying validity of the user terminal by comparing the generated terminal identification code with a terminal identification code stored in the authentication server; generating, by the OTP server, an OTP from the address coordinates when the user terminal is valid; and generating, by the authentication server, an OTP from OTP generation coordinates that are identical to the OTP generation coordinates received by the OTP server and stored in the authentication server, in which the OTP generated by the OTP server is compared with the OTP generated by the authentication server, and a result of the comparison is reported as authentication when the OTPs are the same, and as authentication rejection when the OTPs are not the same.

According to yet another aspect of the present disclosure, there is provided a method for generating an identification code by using a three-dimensional space, the method including: setting address information as address coordinates by converting the address information into coordinate values in degrees, minutes and seconds on latitude and longitude, and reflecting the coordinate values in a unit of seconds to a digits (a>0) after a decimal point; displaying a two-dimensional reference coordinate system with a scale unit that is subdivided to b digits (b>a) after the decimal point with the address coordinates as an origin; forming and displaying a three-dimensional space represented by a three-dimensional function in a three-dimensional space coordinate system, by receiving a two-dimensional function and first boundary coordinates and second boundary coordinates included in the two-dimensional function in the two-dimensional reference coordinate system, and dynamically rotating the two-dimensional function about an arbitrary axis; receiving one code generation coordinate in the three-dimensional space; and generating the identification code by combining respective coordinate values of x, y, and z axes of the one code generation coordinate.

According to the present disclosure, it is possible to use coordinate values of smaller scale units and overcome the limitations of OTP generation range and combination by performing sequential subdivision using coordinates in the unit of seconds among the positional coordinate values on latitude and longitude corresponding to the address of the user, the address of the company, the address of the group building, or the address of the large complex, and performing dynamic transformation from a two-dimensional coordinate system to a three-dimensional coordinate system, thereby making it possible to generate OTPs resistant to hacking.

In addition, during user authentication or payment, an OTP is issued and authenticated with just one button manipulation without inputting a separate password, and thus it is possible to provide convenience in use in authenticating the OTP.

In addition, as a method in which the OTP is generated and authenticated by using address information for the user, when the user makes a payment request, the access time of the user terminal is not used as a reference, but the time of accessing the OTP server is used as the reference, and thus there is an advantage in that the risk of a time function may be excluded.

In addition, there is a strength in that individual unique numbers may be attached to all (inanimate) living things existing on the earth by extending the terminal identification code and may be easily applied to all industrial fields at a low cost.

DETAILED DESCRIPTION OF THE INVENTION

The following detailed description of the present disclosure will be discussed with reference to the accompanying drawings, which show by way of illustration a specific exemplary embodiment in which the present disclosure may be practiced, in order to make the objects, technical solutions and advantages of the present disclosure clearer. These exemplary embodiments are described in sufficient detail to enable those skilled in the art to practice the present disclosure.

Figure 1:
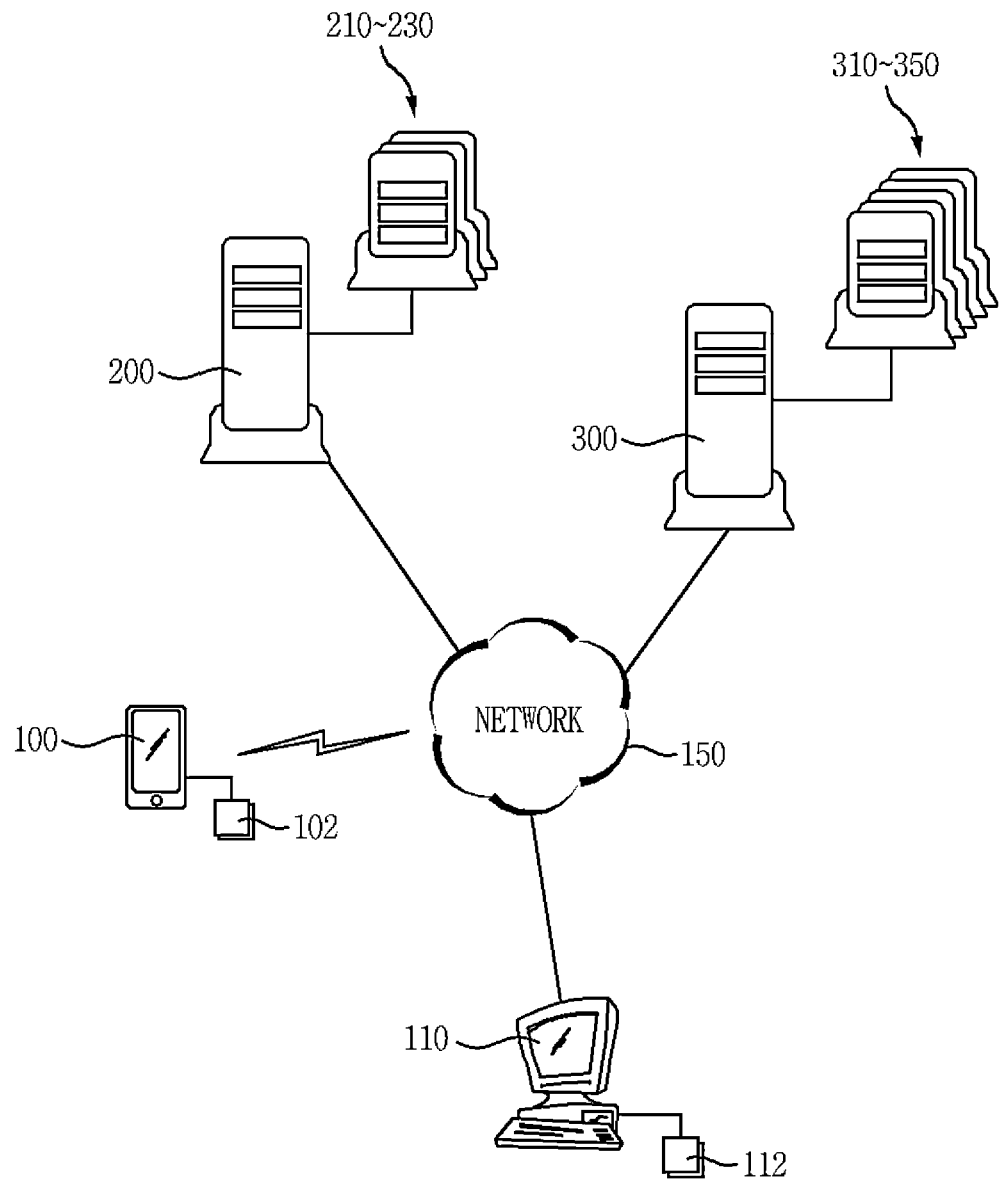
FIG. 1 shows a network configuration for three-dimensional dynamic OTP generating according to an exemplary embodiment of the present disclosure.

FIG. 1 shows a network configuration for three-dimensional dynamic OTP generation according to an exemplary embodiment of the present disclosure.

A user authentication system according to an exemplary embodiment of the present disclosure includes user terminals 100 and 110 in which OTP authentication applications 102 and 112 are installed, an OTP server 200 connected via a network 150 including the Internet, and an authentication server 300 connected to the OTP server 200 and an internal network (intranet).

The OTP authentication applications 102 and 112 may utilize decentralized identifier (DID) technology. The decentralized identifier refers to a blockchain-based electronic identity authentication technology that stores user personal information in their device and allows the user to selectively submit only information that is needed for authentication.

The user terminals 100 and 110 include a computer system such as a desktop as well as a portable information communication terminal such as a smartphone.

The OTP authentication applications 102 and 112 installed on the user terminals 100 and 110 have a function of transmitting user personal information, such as name, gender, date of birth, resident registration number, mobile phone number, and address information to the OTP server 200, and a function of storing a private key value to be described later and transmitting the private key value when a request for generating/authenticating the OTP is made.

When the present disclosure is compared with the OTP generation in the related art, the basic difference therebetween is that the user terminals 100 and 110 themselves do not generate the OTP, and as a result, even if the user terminal is hacked, it is not possible to hack the OTP itself.

The OTP server 200 generates and issues a three-dimensional dynamic OTP by a request from the user terminals 100 and 110 and the authentication server 300 authenticates the validity of the issued OTP, and the OTP server 200 and the authentication server 300 may be operated by an institution that issues and authenticates the OTP, such as a financial institution.

The OTP server 200 and the authentication server 300 include data servers 210 and 310 for storing user meta information, data servers 220 and 320 for storing environment variables related to OTP generation, and data servers 230 and 330 for storing OTP history information including the used OTP, and in particular, the authentication server 300 further includes a data server 340 for storing the terminal identification code generated by the OTP server 200 and a data server 350 for storing environment variables applied when the OTP generation code is calculated.

As will be described later, the environment variables related to OTP generation may include various types of information such as subdivided scale units, OTP generation patterns (rules), coordinate movement information, first and second boundary coordinates, two-dimensional functions, OTP generation coordinates, and rotation information in three-dimensional space.

Figure 2:
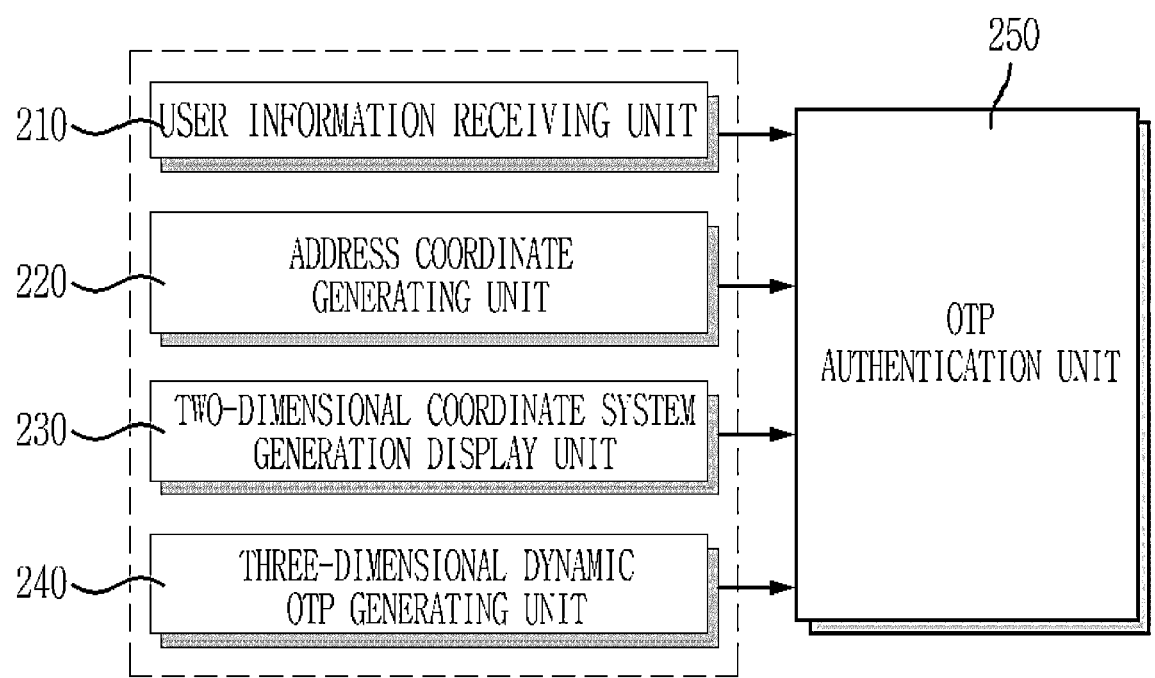
FIG. 2 shows a functional configuration of an OTP server for three-dimensional dynamic OTP generating.

FIG. 2 shows a functional configuration of an OTP server.

The configuration of the OTP server 200 for generating a three-dimensional dynamic OTP is largely divided into components 210 to 240 for generating a three-dimensional dynamic OTP and an OTP authentication unit 250 for authenticating the validity of the generated three-dimensional dynamic OTP.

The components for generating the three-dimensional dynamic OTP include a user information receiving unit 210, an address coordinate generating unit 220, a two-dimensional reference coordinate system generation display unit 230, and a three-dimensional dynamic OTP generating unit 240.

The user information receiving unit 210 may receive user information including meta information for the user and address information as a private key value from the user terminals 100 and 110, and may receive various private key values using block chain technology.

The address coordinate generating unit 220 converts the received address information for the user into coordinate values in degrees, minutes, and seconds on latitude and longitude, and extracts only coordinates in the unit of seconds from among them and converts the extracted coordinates into address coordinates.

The two-dimensional reference coordinate system generation display unit 230 generates reference coordinates by shifting the address coordinates on coordinates more subdivided than the scale units constituting the address coordinates, and generates and displays a two-dimensional reference coordinate system with the reference coordinates as the origin.

Here, the two-dimensional reference coordinate system may be a coordinate system having a scale unit obtained by further subdividing the scale unit that has generated the reference coordinates, which will be described later.

The three-dimensional dynamic OTP generating unit 240 provides first and second boundary coordinates and a two-dimensional function including both boundary coordinates, that is, passing through both boundary coordinates, within the two-dimensional reference coordinate system.

In addition, the three-dimensional dynamic OTP generating unit 240 dynamically generates a three-dimensional space by rotating the two-dimensional function about the x-axis, the y-axis, or an arbitrary axis of the two-dimensional reference coordinate system, and generates an OTP generation code by combining coordinate values of the OTP generation coordinates in three-axis (x-axis, y-axis, and z-axis) directions, which are selected by the user or the OTP server 200, in the three-dimensional space, and stores the OTP generation code.

Further, the three-dimensional dynamic OTP generating unit 240 generates an OTP by applying a preset OTP generation pattern (rule) from the OTP generation code, and transmits it to the authentication server 300.

The OTP authentication unit 250 receives the private key value from the authenticated user terminals 100 and 110 without input of password at login, verifies the validity of the user terminal, and requests the authentication server 300 to authenticate the validity of the OTP generated by the OTP server 200.

The user first performs a procedure of accessing the OTP server 200 through the user terminals 110 and 120 to receive and register a terminal identification code unique to the terminal, that is, a terminal identification code used for verifying the validation of the user terminal, and then, performs a procedure for generating and authenticating an OTP through the OTP server 200.

Figure 3:
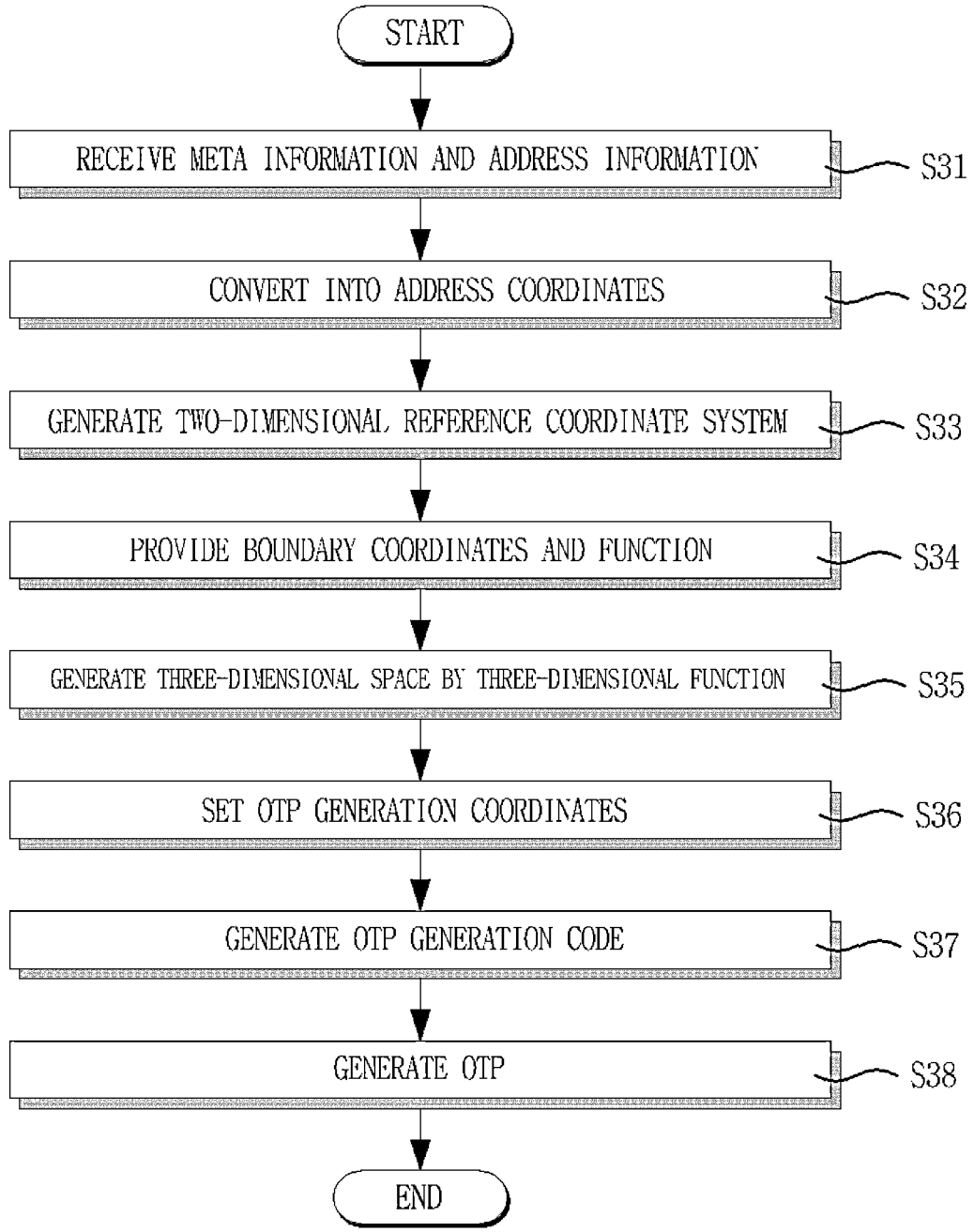
FIG. 3 is a flowchart illustrating a method for generating a three-dimensional dynamic OTP according to an exemplary embodiment of the present disclosure.

FIG. 3 is a flowchart illustrating a method for generating a three-dimensional dynamic OTP according to an exemplary embodiment of the present disclosure.

As described above, the OTP authentication applications 102 and 112 are installed in the user terminals 100 and 110 in the form of an application program capable of interworking with the OTP server 200, and the OTP authentication applications 102 and 112 transmit address information and pre-stored code generation coordinates to the OTP server 200 when the request for generating the OTP is made.

Here, the code generation coordinates are selected by the user in the process of generating the terminal identification code and stored in advance in the user terminals 100 and 110, which will be described later.

The user information receiving unit 210 receives address information and code generation coordinates from the user terminals 110 and 120 as private key values (step S31).

The address coordinate generating unit 220 converts the received address information into actual positional coordinates on latitude and longitude (step S32).

Here, as the actual positional coordinates on latitude and longitude, coordinate values provided through GPS or GIS may be used.

Figure 4:
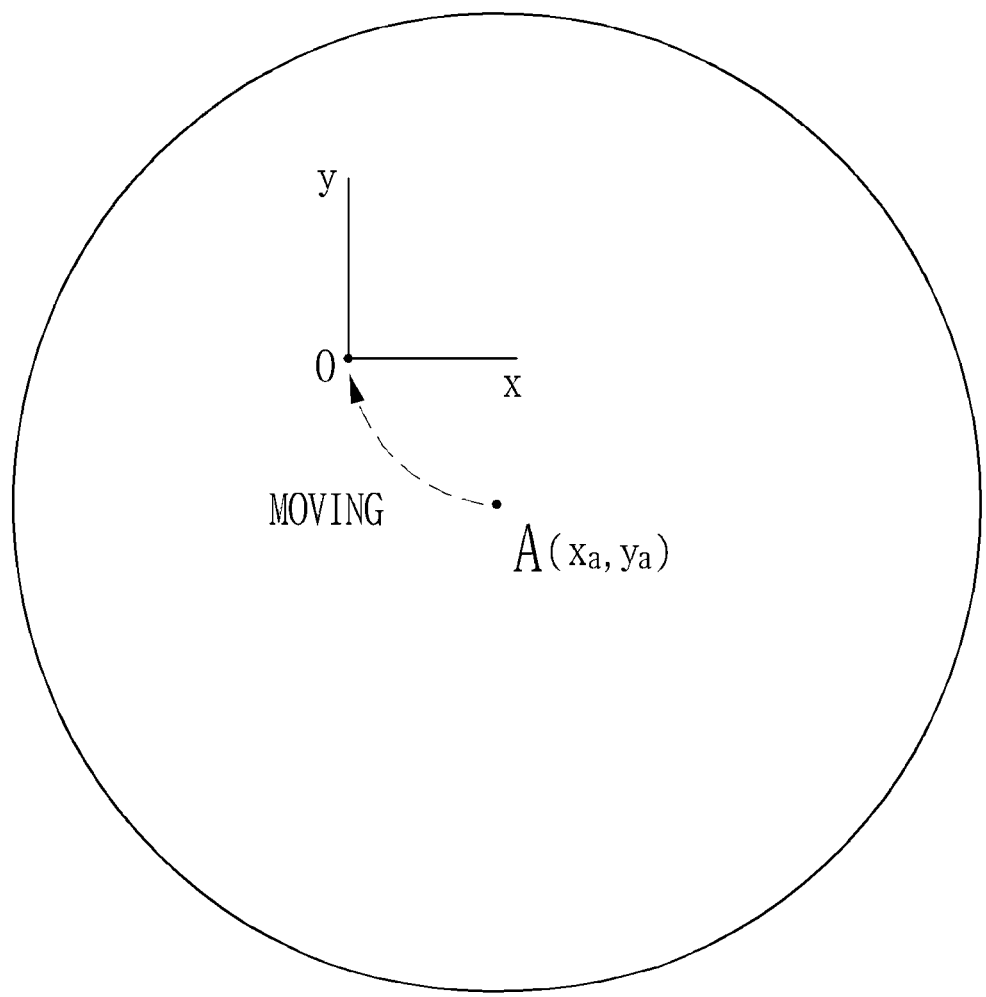
FIG. 4 shows a method for selecting reference coordinates.

FIG. 4 shows a method for selecting reference coordinates.

Actual positional coordinates on latitude and longitude may be expressed as $A(x_a, y_a)$, which is given in degrees, minutes, and seconds, for example, latitude ($x_a$) of 37 degrees, 16 minutes, and 34.7659 seconds and longitude ($y_a$) of 130 degrees, 15 minutes, and 23.3746 seconds.

In the present disclosure, only coordinate values in the unit of seconds are used out of the actual positional coordinates expressed in degrees, minutes, and seconds on latitude and longitude, and this is referred to as 'address coordinates'.

In the present exemplary embodiment, the coordinates in the unit of seconds are expressed in the unit of centimeters (cm) up to two digits after the decimal point, that is, $10^{-2}$ seconds, and expressed in millimeters (mm) up to four digits after the decimal point, that is, $10^{-4}$ seconds, and a number with five digits or more after the decimal point, that is, $10^{-5}$ seconds may be a finite or infinite decimal number less than 1 mm, which may or may not be a number that falls within the range of error or deviation of GPS or GIS information.

Therefore, when normal coordinates are used, almost accurate positional coordinates may be indicated only by displaying up to two digits after the decimal point, that is, the unit of centimeters (cm).

Therefore, in the exemplary embodiment of the present disclosure, up to two digits after the decimal point in the unit of seconds (in the unit of centimeters) are used to display the actual coordinate values corresponding to the address of the user, that is, the address coordinates, and the address coordinates A ($x_a, y_a$) of the present exemplary embodiment becomes (34.76, 23.37).

In addition, numbers from five digits after the decimal point in the unit of seconds are highly likely to be empty numbers and may be just meaningless numbers, which is used in the present disclosure to create an indeterminate pure random number.

In the present exemplary embodiment, in order to increase the number of indeterminate random numbers, the number of digits after the decimal points in the unit of seconds may be further increased, and it is efficient to increase the number in steps.

The two-dimensional reference coordinate system generation display unit 230 moves address coordinates A converted by the address coordinate generating unit 220 to arbitrary coordinates on the coordinate system with a scale unit that is subdivided, and generates a two-dimensional reference coordinate system.

Specifically, as shown in FIG. 4, a circular region (size is not specified) is set centered on the address coordinates A, the region is subdivided to scale units with ten digits after the decimal point (primary subdivision), and the address coordinates A are moved to one arbitrary coordinates O (hereinafter referred to as 'reference coordinate') within the corresponding region.

As a result of moving the address coordinates A with two digits after the decimal point to any one point within the coordinates with scale units that are subdivided to ten digits after the decimal point, the address coordinates A may be expressed with ten digits after the decimal point.

The number of coordinates that may be the reference coordinates may vary depending on the size of the subdivided scale unit, and in the present exemplary embodiment, subdivision is performed to ten digits after the decimal point as the scale units, and thus it is possible to generate approximately 1010 reference coordinates, but among them, only one reference coordinate is used.

Here, since the selection of the reference coordinates is made by the two-dimensional reference coordinate system generation display unit 230, only the OTP server 200 knows about information on the selected reference coordinates.

In this way, generating, from the address coordinates, a plurality of reference coordinates with different properties means the same as specifically subdividing, for example, a large-scale apartment corresponding to the address coordinates into complexes, buildings, house numbers, and floors.

The address coordinates are moved to a location that only the OTP server 200 knows about and set as the reference coordinates, and in setting as the reference coordinates, the number of selectable reference coordinates may be made into hundreds of millions by further subdividing the scale unit, making it more difficult to hack the reference coordinates.

Figure 5:
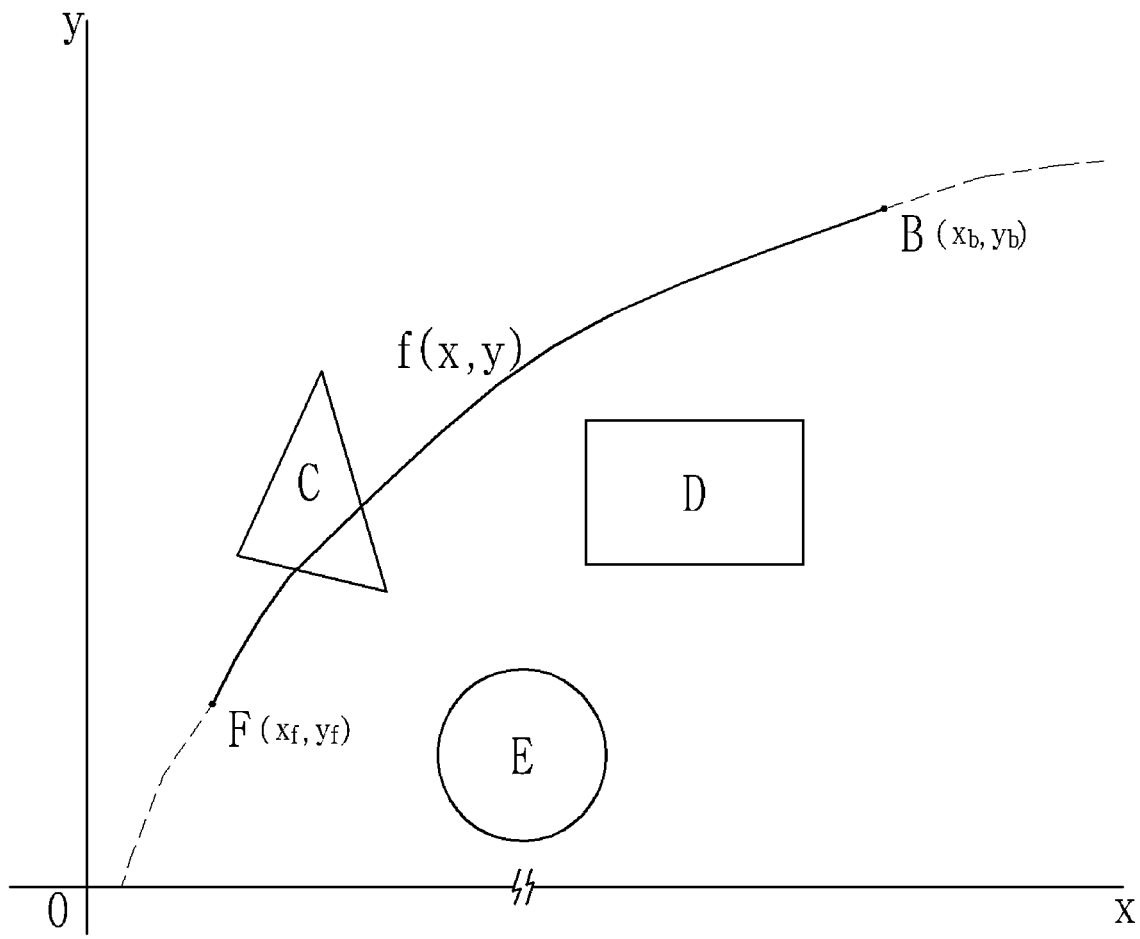
FIG. 5 shows a two-dimensional reference coordinate system.

FIG. 5 shows a two-dimensional reference coordinate system.

The two-dimensional reference coordinate system generation display unit 230 generates and displays a new two-dimensional reference coordinate system having the selected reference coordinates O as the origin, as shown in FIG. 5 (step S33).

The two-dimensional reference coordinate system may be a coordinate system formed by further subdividing the number of digits after the decimal point in the unit of seconds, for example, may be a coordinate system in which 20 digits after the decimal point are used as a scale unit.

In other words, as described above, the reference coordinates have been set by moving the address coordinates on the coordinates with the scale unit subdivided to ten digits after the decimal point in the unit of seconds, and in this phase, the two-dimensional reference coordinate system are composed of coordinates by further subdividing (second subdivision) the x-axis and y-axis to 20 digits after the decimal point in the unit of seconds, respectively.

In addition, the two-dimensional reference coordinate system generation display unit 230 presents boundary coordinates B and F and a two-dimensional function f(x, y) passing through the boundary coordinates in the two-dimensional reference coordinate system (step S34).

Optionally, the user may select any one or both of the boundary coordinates; for example, the user may easily select boundary coordinates by allowing the two-dimensional reference coordinate system generation display unit 230 to enlarge and display an arbitrary part of the two-dimensional reference coordinate system by user manipulation.

Furthermore, optionally, the two-dimensional function f(x, y) may be applied to the entire two-dimensional reference coordinate system without setting the boundary coordinates.

In the present exemplary embodiment, it is assumed that the user has selected a boundary coordinate B (hereinafter referred to as a 'first boundary coordinate').

Looking at the coordinates of FIG. 5, only the first quadrant is shown for convenience of illustration, in fact, all four quadrants may be included, and as will be described later, when the OTP server presents the two-dimensional function f(x, y), the two-dimensional function f(x, y) takes all quadrants as domains and ranges.

In the present exemplary embodiment, the first and second boundary coordinates B and F are numbers expressed to 20 digits after the decimal point in the unit of seconds, which means that the first and second boundary coordinates $B(x_b, y_b)$ and $F(x_f, y_f)$ may be selected from the following numerical ranges.

xx.00000000000000000000 to xx.99999999999999999999
yy.00000000000000000000 to yy.99999999999999999999

Therefore, the number of coordinates that may be selected in numeric units of 20 digits after the decimal point on the x-axis and y-axis is the number of intersections of the x-axis and the y-axis including the origin, and is approximately $10^{20} \times 10^{20} = 10^{40}$.

Therefore, the number of coordinates is almost infinite, and one of them may be selected and used. It is not easy for a hacker to select one of $10^{40}$ coordinates and use it as a password in 1/t second (time function, t>1), that is, at the time when the user presses the button, even if the hacker uses a sophisticated hacking method or a high-performance computer.

In addition, when the user presses the button in 1/t seconds, this is executed first, and the man-in-the-middle interception by the hacker comes second, and thus, even if the hacker inputs the same value, the OTP server has a null value, which makes it possible to provide the same effect as preventing the man-in-the-middle interception of quantum cryptography.

When the user selects the first boundary coordinates B, the three-dimensional dynamic OTP generating unit 240 provides a second boundary coordinates F corresponding to the first boundary coordinates B and presents the two-dimensional function f(x, y) including the first and second boundary coordinates, that is, passing through the first and second boundary coordinates.

Information on the first and second boundary coordinates and the two-dimensional function is stored in the data server 220 of the OTP server 200, as will be described later, and again is stored in the data server 320 of the authentication server 300 at the request of the OTP server 200.

As shown in FIG. 5, the first and second boundary coordinates $B(x_b, y_b)$ and $F(x_f, y_f)$ are applied as boundary values defining the length of the two-dimensional function f(x, y) that infinitely extends to determine the domain and range of the function f(x, y).

Accordingly, only a portion indicated by a solid line in FIG. 5 may be an application portion of the two-dimensional function f(x, y).

Since the OTP server selects the second boundary coordinates F and the function f(x, y) as described above, no one other than the only OTP server may know the properties and size of the function f(x, y) when the user sets it for the first time, and thus hacking may be almost impossible.

Meanwhile, referring to FIG. 5, by setting figures C, D, E, or the like, as domain and range in the two-dimensional reference coordinate system and excluding the coordinates included therein from the selection, the selection of the first and second boundary coordinates may be made more precisely, thereby making hacking more difficult.

The three-dimensional dynamic OTP generating unit 240 generates a three-dimensional space dynamically represented as a three-dimensional function f(x, y, z) by rotating the two-dimensional function f(x, y), in which the domain and range are determined, about the x-axis or y-axis of the two-dimensional reference coordinate system, or an arbitrary axis (step S35).

Figure 6:
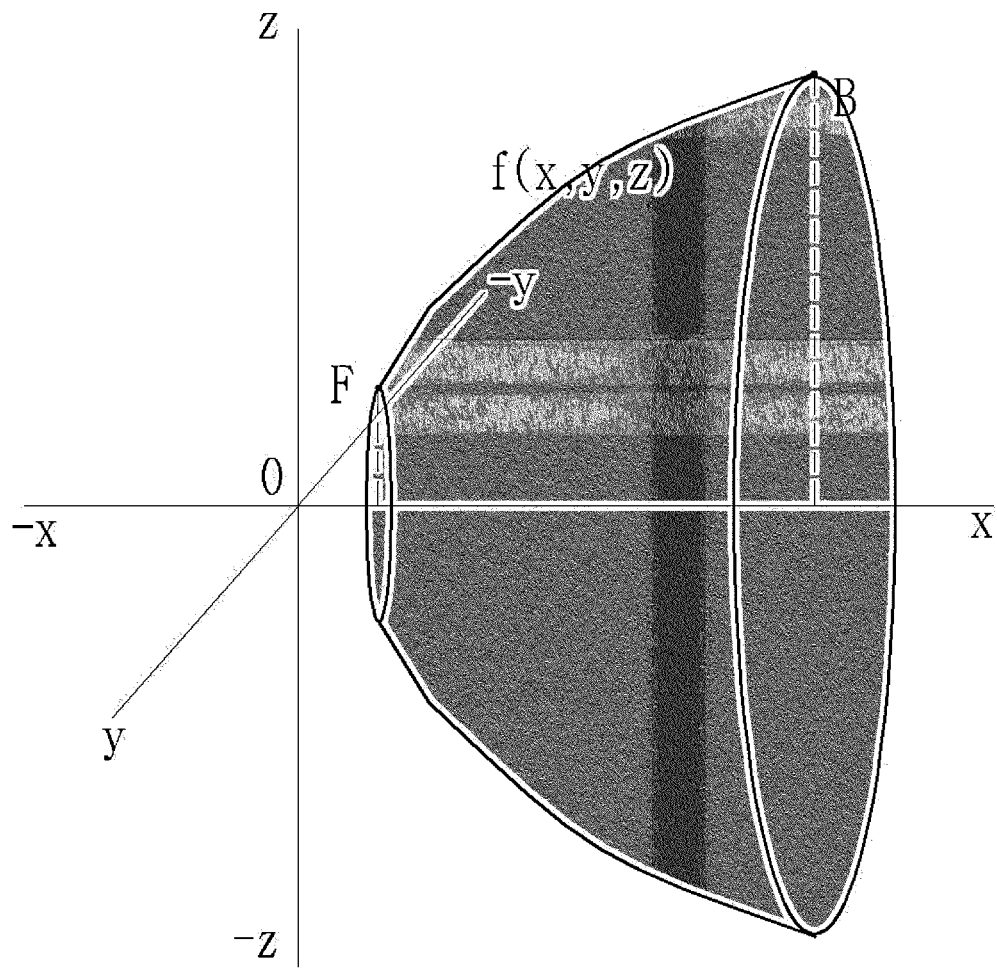
FIG. 6 shows a three-dimensional space generated from a function in which a domain and a range are determined in a two-dimensional reference coordinate system.
Figure 7:
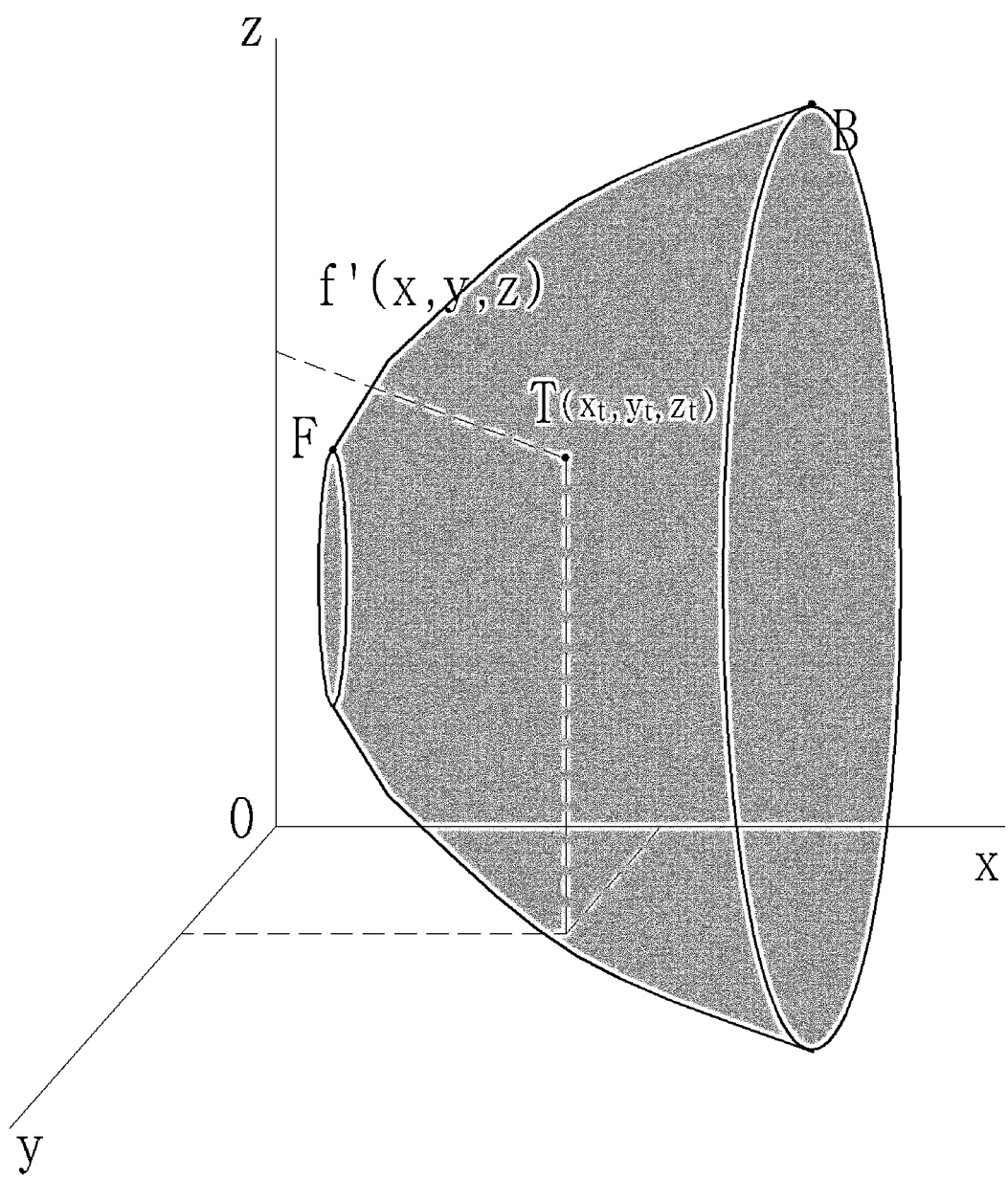
FIG. 7 shows a three-dimensional space that is generated in a three-dimensional space coordinate system and of which the coordinates are moved so that all of x, y, and z axes have positive values.

FIG. 6 shows a three-dimensional space generated by the three-dimensional dynamic OTP generating unit 240 rotating the two-dimensional function f(x, y), in which the domain and range are determined, about the x-axis in the two-dimensional reference coordinate system shown in FIG. 5, and FIG. 7 shows a three-dimensional space that is generated in a three-dimensional space coordinate system and of which coordinates are moved so that the all of x-axis, the y-axis, and the z-axis have positive values.

Here, the three-dimensional space coordinate system has a more subdivided scale unit than the two-dimensional coordinate system, and in the present exemplary embodiment, has, for example, a scale unit subdivided to 40 digits after the decimal point (tertiary subdivision).

As shown in FIG. 7, the three-dimensional dynamic OTP generating unit 240 of the OTP server 200 causes the OTP server 200 to select one arbitrary point within the generated three-dimensional space to set the selected point as the OTP generation coordinates $T(x_t, y_t, z_t)$ (step S36).

Here, the point selected by the OTP server 200 in the three-dimensional space, that is, the OTP generation coordinate T, is predetermined in response to the number of times of OTP requests, and is stored in the data servers 220 and 320 of the OTP server 200 and the authentication server 300. That is, when the OTP server 200 selects the OTP generation coordinates, the authentication server 300 also recognizes the same OTP generation coordinates.

Of course, the OTP generation coordinates that are determined in advance do not belong to the three-dimensional exclusion space, and in particular, are preset in consideration of dynamic movements such as movement or rotation of the three-dimensional space.

More coordinates may be generated from the three-dimensional function f(x, y, z) corresponding to the three-dimensional space, and by using these coordinates, the user may be completely freed from the burden of passwords, and not only hacking by others but also hacking by insiders may also be prevented in advance.

Figure 8:
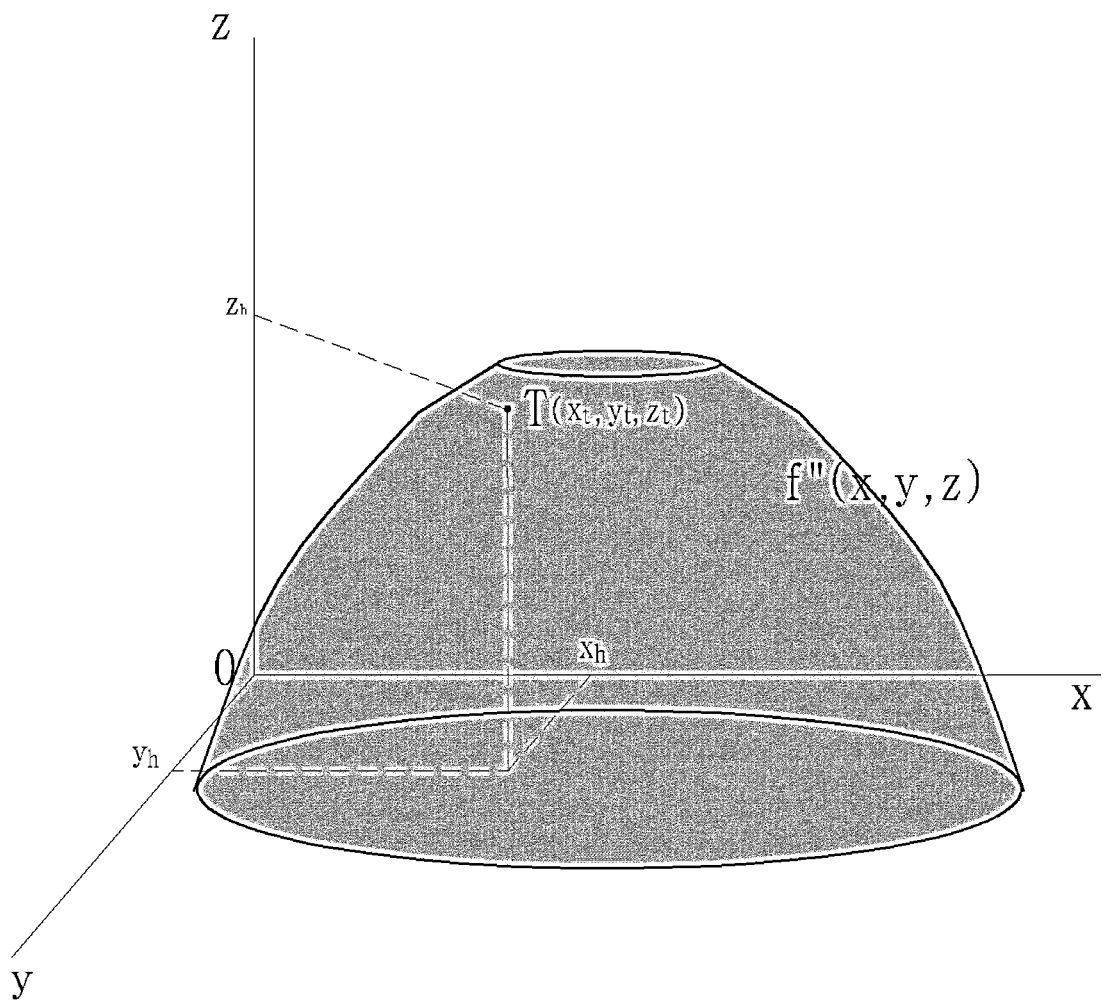
FIG. 8 shows a three-dimensional space generated by rotating a predetermined angle in a three-dimensional direction with respect to an origin O in a three-dimensional coordinate system.

FIG. 8 shows a three-dimensional space dynamically generated by rotating a predetermined angle in a three-dimensional direction with respect to the origin O in a three-dimensional coordinate system.

Dynamically moving the three-dimensional space through movement or rotation before selecting the OTP generation coordinates as described above makes it difficult for hackers to track, and thus it is possible to increase the security level.

Meanwhile, as described above, when the exclusion regions by figures C, D, and E are set in the two-dimensional reference coordinate system, by forming a three-dimensional exclusion space by the rotation of the exclusion regions and preventing the OTP generation coordinates from being set in the exclusion space, it is possible to further increase the security level.

In particular, when the three-dimensional space is moved or rotated, the three-dimensional exclusion space is also dynamically moved and changed, and as a consequence, the change for the selection of OTP generation coordinates occurs in many times, which makes it difficult to hack, and difficult to solve a task even with a high-performance computer.

Incidentally, when the coordinate values of the OTP exclusion space are selected when the user terminal 100 or 110 makes a request for generating an OTP, a null value is output; however, when the selection of the OTP exclusion space is repeated, this problem may be solved by installing a firewall, removing the OTP exclusion space for 1/t second, randomly selecting the OTP generation coordinates in the three-dimensional space in which the OTP exclusion space is removed, and then immediately returning the space to the original state.

As mentioned above, since the three-dimensional space coordinate system is subdivided into scale units with 40 digits after the decimal point, for each of axes of an OTP generation coordinate H, 40 digits after the decimal point are set, and from among them, numbers from the 21th digit to the 40th digit are extracted and used as significant figures.

For example, significant figures (for example, represented by numbers in parentheses) extracted from each axis may be as follows.

x-axis: xx.xxxxxxxxxxxxxxxxxxxx (11112223344568999000)
y-axis: yy.yyyyyyyyyyyyyyyyyyyy (11112222334456889990)
z-axis: zz.zzzzzzzzzzzzzzzzzzzz (11111222344458999000)

Next, as shown in Table 1, the OTP generation code is generated by calculating the number of times each of numbers constituting three significant figures extracted from each of the axes is expressed, displaying combinations of constituent numbers with the numbers of times thereof, and arranging the constituent numbers in order (step S37).

TABLE 1

| order | constituent numbers | number of times | combinations of constituent numbers with number of times |
|---|---|---|---|
| 1 | 1 | 13 | 113 |
| 2 | 2 | 10 | 210 |
| 3 | 3 | 05 | 305 |
| 4 | 4 | 07 | 407 |
| 5 | 5 | 03 | 503 |
| 6 | 6 | 02 | 602 |
| 7 | 7 | 00 | 700 |
| 8 | 8 | 04 | 804 |
| 9 | 9 | 09 | 909 |
| 10 | 0 | 07 | 007 |

Therefore, the OTP generation code becomes "113 210 305 407 503 602 700 804 909 007". The corresponding OTP generation code is expressed by performing a sequential combination in the order of '1-2-3-4-5 7-8-9-10', and the order may be changed.

For example, the corresponding OTP generation code may be expressed as '407 700 305 602 210 503 113 007 909 804' by performing combination in the order of '4-7-3-6-2-5-1-10-9-8'.

In addition, in the present example, the constituent numbers are combined with the numbers of times in the order of 1 to 0, and unlike this, the combination of the constituent numbers and the numbers of times thereof may be performed randomly without a rule.

As described above, it is possible to prevent hacking of the OTP generation code itself by changing the order, randomizing the combination of the constituent numbers and the numbers of times thereof, or applying both of them.

As described above, OTP generation and authentication are performed after the initial connection, and the three-dimensional dynamic OTP generating unit 240 generates an OTP by applying an OTP generation pattern (rule) to the OTP generation code (step S38).

The OTP generation pattern may exist in various ways, and for example, an odd number, an even number, and the first number may be set to a multiple of n based on the 'order'.

For example, when a multiple of 3 is applied as a generation pattern, 305, 602, and 909, where the first numbers are multiples of 3, are selected, and a combination '305 602 909' thereof may be generated as an OTP.

According to the method for generating a three-dimensional dynamic OTP described above, 1) from among the positional coordinate values (units of degrees, minutes, and seconds) on latitude and longitude corresponding to the address of the user, the coordinates in the unit of seconds are converted into the address coordinates in the unit of centimeters (two digits after the decimal point in the unit of seconds),
2) the address coordinates are moved in the coordinate system in which the scale unit is subdivided to form the reference coordinates,
3) the two-dimensional reference coordinate system is generated with the reference coordinate as the origin, and with the scale unit that is more subdivided,
4) the OTP server selects the second boundary coordinates and provides the two-dimensional function including the first and second boundary coordinates, when the user or the OTP server selects the first boundary coordinates in the two-dimensional reference coordinate system,
5) the domain and range are determined according to the first and second boundary coordinates, and the three-dimensional space is dynamically generated by rotating the two-dimensional function about an arbitrary axis, and
6) in the three-dimensional space of three-dimensional space coordinates with the more subdivided scale unit, the OTP server sets the OTP generation coordinates to generate an OTP generation code, and applies a preset OTP generation pattern to the OTP generation code to generate an OTP.

Therefore, the number of set coordinates increases almost infinitely at each phase due to multiple subdivision, and as a result, it is not easy to hack by tracking the set coordinates, and only one is selected and used from among infinite coordinates, and as a result, it is not easy for a hacker to hack the coordinates selected in each of phases subdivided at the moment when an OTP generation request is transmitted from the user terminal.

Hereinafter, a method for authenticating a three-dimensional dynamic OTP will be described.

The user accesses the authentication server 300 through an authentication procedure such as login through the OTP authentication applications 102 and 112 installed in the user terminals 100 and 110.

When the user terminals 100 and 110 receive a request for OTP input for payment or user authentication from a financial institution server, the user presses an OTP input button provided by the OTP authentication applications 102 and 112.

The OTP authentication applications 102 and 112 transmit user information and private key values, that is, address coordinates and code generation coordinates, to the OTP server 200.

Here, the code generation coordinates are set in advance in the same way as the OTP generation coordinates through steps S31 to S36, and the set code generation coordinates are stored in the user terminals 110 and 120.

Further, through the same process as in step S37, a terminal identification code is generated from the code generation coordinates, and the generated terminal identification code is transmitted to the authentication server 300 together with the environment variables according to the generation and is stored in the data server 340.

The OTP authentication unit 250 of the OTP server 200 transmits the address coordinates and the code generation coordinates to the authentication server 300 to make a request for verifying the validation of the user terminal.

The authentication server 300 generates a new terminal identification code by performing step S37 of FIG. 3 using the received code generation coordinates, and verifies the validity of the user terminal by comparing the generated new terminal identification code with the terminal identification code stored in the data server 340.

When the validity is authenticated, an OTP generated by performing steps S33 to S38 of FIG. 3 from the address coordinates is transmitted to a buffer of the authentication server 300 to request authentication of the OTP.

The authentication server 300 extracts the same generation coordinates as the OTP generation coordinates set by the OTP server 200 from among the OTP generation coordinates set in advance and stored in the data server 320 in response to the number of times of OTP requests, applies the OTP generation pattern to generate the OTP, and compares the OTP with the OTP stored in the buffer.

As a result of the comparison, when both OTPs are the same, the result is reported as authentication, and when the OTPs are not the same, as authentication rejection.

Since the user authentication system according to an exemplary embodiment of the present disclosure does not generate an OTP in the user terminal when the user performs user authentication or when the user makes payment, there is no likelihood of hacking the OTP from the user terminal.

In addition, since the user does not have to input a separate OTP or password, convenience in use is provided in authenticating the OTP.

Furthermore, since the present disclosure is a method for generating and authenticating an OTP using positional information for the user, there is an advantage in that the risk of a time function may be excluded.

Although the present disclosure has been described with reference to the exemplary embodiments illustrated in the drawings, it is merely exemplary, and it is to be understood to persons skilled in the art that various modifications and equivalent other exemplary embodiments could be made therefrom. Therefore, the true technical protection scope of the present disclosure should be defined only by the appended claims.

What is claimed is:

1. A method for generating a three-dimensional dynamic one-time password (OTP) that is applied to a one-time password authentication system including a user terminal and an OTP server connected to the user terminal, the method comprising:

setting, by the OTP server, a user address received from the user terminal as address coordinates by converting the user address into coordinate values in degrees, minutes, and seconds on latitude and longitude and reflecting the coordinate values in a unit of seconds to a digits (a>0) after a decimal point;

displaying a two-dimensional reference coordinate system with a scale unit that is subdivided to c digits (c>a) after the decimal point with the address coordinates as an origin;

forming and displaying a three-dimensional space represented by a three-dimensional function in a three-dimensional space coordinate system, by receiving a two-dimensional function and first boundary coordinates and second boundary coordinates included in the two-dimensional function in the two-dimensional reference coordinate system, and dynamically rotating the two-dimensional function about an arbitrary axis;

receiving one OTP generation coordinate in the three-dimensional space; and generating a one-time password by generating an OTP generation code by combining respective coordinate values of x, y, and z axes of the one OTP generation coordinate, and applying a preset generation pattern from the OTP generation code.

2. The method of claim 1, wherein the two-dimensional reference coordinate system is displayed by setting new reference coordinates by moving the address coordinates on a coordinate system with a scale unit that is subdivided to b digits (c>b >a) after the decimal point, and using the new reference coordinates as the origin.

3. The method of claim 2, wherein the three-dimensional space coordinate system has a scale unit that is subdivided to d digits (d>c) after the decimal point.

4. The method of claim 1, wherein the first and second boundary coordinates are input from the user terminal, the OTP server, or both, and the two-dimensional function is provided from the OTP server.

5. The method of claim 1, wherein the first boundary coordinates are input from the user terminal and the second boundary coordinates and the two-dimensional function are input from the OTP server such that only the OTP server recognizes a property and size of the two-dimensional function to make hacking impossible.

6. The method of claim 1, further comprising forming a three-dimensional exclusion space by setting at least one exclusion region in the two-dimensional reference coordinate system and rotating the exclusion region about the arbitrary axis.

7. The method of claim 6, wherein in the receiving of the one OTP generation coordinate, when a coordinate value in the exclusion region is repeatedly selected, a firewall is installed, the exclusion region is removed for 1/t seconds and then the OTP generation coordinates are randomly selected in the three-dimensional space, and the firewall is returned to an original state.

8. The method of claim 1, wherein the three-dimensional space is moved or rotated about an arbitrary axis to form a new three-dimensional space.

9. The method of claim 1, wherein the user terminal does not store information related to the generated one-time password.

10. The method of claim 1, wherein the OTP server includes a data server storing user meta information, a data server storing an environment variable related to OTP generation, and a data server storing OTP history information including a used OTP.

11. The method of claim 10, wherein the environment variable related to OTP generation includes a subdivided scale unit, OTP generation pattern (rule), terminal code generation pattern (rule), coordinate movement information, first and second boundary coordinates, a two-dimensional function, OTP generation coordinates, and a rotation angle in a three-dimensional space.

12. The method of claim 1, wherein the OTP generation code is generated by calculating the number of times each of numbers constituting three significant figures extracted from each of the axes is expressed, displaying combinations of constituent numbers with the numbers of times thereof, and arranging the combination in order.

13. The method of claim 12, wherein the OTP generation code itself is prevented from being hacked by changing the order of the constituent numbers, randomizing the combinations of constituent numbers with the numbers of times, or both.

14. A method for generating an identification code by using a three-dimensional space, the method comprising:

setting address information as address coordinates by converting the address information into coordinate values in degrees, minutes and seconds on latitude and longitude, and reflecting the coordinate values in a unit of seconds to a digits (a>0) after a decimal point;

displaying a two-dimensional reference coordinate system with a scale unit that is subdivided to b digits (b>a) after the decimal point with the address coordinates as an origin;

forming and displaying a three-dimensional space represented by a three-dimensional function in a three-dimensional space coordinate system, by receiving a two-dimensional function and first boundary coordinates and second boundary coordinates included in the two-dimensional function in the two-dimensional reference coordinate system, and dynamically rotating the two-dimensional function about an arbitrary axis;

receiving one code generation coordinate in the three-dimensional space; and generating the identification code by combining respective coordinate values of x, y, and z axes of the one code generation coordinate.

15. The method of claim 14, wherein the generated identification code is transmitted to and stored in a remote server together with an environment variable according to the generation.

16. A three-dimensional dynamic one-time password (OTP) generating system comprising:

a user terminal; and an OTP server connected to the user terminal, wherein the OTP server includes a user information receiving unit, an address coordinate generating unit, a two-dimensional reference coordinate system generation display unit, a three-dimensional dynamic OTP generating unit, and an OTP authentication unit, the user information receiving unit receives user information including meta information for a user and address information as a private key value from the user terminal, the address coordinate generating unit converts the received address information for the user into coordinates in degrees, minutes, and seconds on latitude and longitude, and extracts only coordinates in a unit of seconds and converts the extracted coordinates into address coordinates, the two-dimensional reference coordinate system generation display unit generates reference coordinates by shifting the address coordinates on coordinates more subdivided than the scale units constituting the address coordinates with the address coordinates as a center, and generates and displays a two-dimensional reference coordinate system with the reference coordinates as an origin, the three-dimensional dynamic OTP generating unit receives first and second boundary coordinates and a two-dimensional function passing the first and second boundary coordinates within the two-dimensional reference coordinate system, dynamically generates a three-dimensional space by rotating the two-dimensional function about an x-axis, a y-axis, or an arbitrary axis of the two-dimensional reference coordinate system, generates an OTP generation code by combining coordinate values of OTP generation coordinates in three-axis (x-axis, y-axis, and z-axis) directions, which are selected by the OTP server, in the three-dimensional space, and generates an OTP by applying a preset OTP generation pattern (generation rule), and the OTP authentication unit receives a private key value from an authenticated user terminal at login without input of a password, verifies validity of the user terminal, and requests the authentication server to authenticate validity of the OTP generated by the OTP server.

\* \* \* \* \*